Patented Apr. 20, 1937

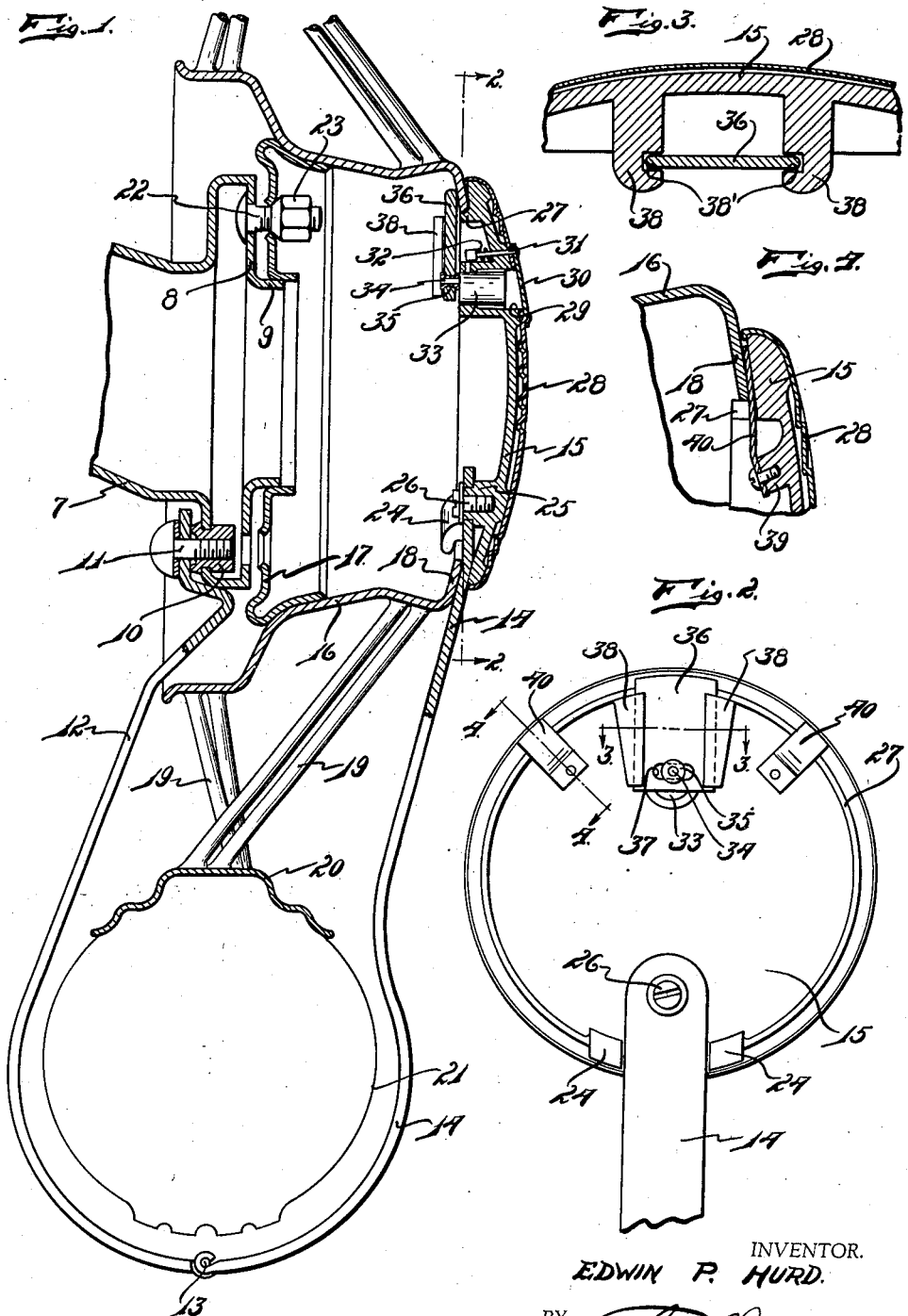

2,077,698

UNITED STATES PATENT OFFICE 2,077,698

LOCKING MECHANISM

Edwin P. Hurd, Detroit, Mich.

Application December 14, 1931, Serial No. 580,787

8 Claims. (Cl. 70—168)

My invention relates to a new and useful improvement in a locking mechanism adapted particularly for use in locking a spare wheel on a suitable support.

It is an object of the invention to provide a locking mechanism whereby a vehicle wheel may be so protected that the means for securing the wheel to its support will be enclosed and the enclosing structure locked against being opened.

Another object of the invention is the provision of a locking mechanism of this class which will be simple in structure, economical of manufacture, durable, highly efficient in use, light and easily and quickly mounted in position.

Another object of the invention is the provision of a locking mechanism of this class which may be easily and quickly operated and which will not mar the appearance of a vehicle with which used.

Other objects will appear hereinafter.

The invention consists in the combination and arrangement of parts hereinafter described and claimed.

The invention will be best understood from a reference to the accompanying drawing which forms a part of this specification and in which, Fig. 1 is a central vertical sectional view of the invention showing it applied, Fig. 2 is a fragmentary view taken on line 2—2 of Fig. 1, Fig. 3 is a fragmentary view taken on line 3—3 of Fig. 2, Fig. 4 is a fragmentary sectional view taken on line 4—4 of Fig. 2.

In the drawing I have shown the invention used for locking a vehicle wheel on a suitable support 7. When the device is used with vehicles on which the spare wheel is carried on the side of the vehicle which is provided with a well in the fender a slight modification of the device will be necessary, but this modification will, it is believed, appear obvious. As shown, the bracket or support 7 is provided with a flange 8 terminating in a neck 9. A nut 10 carried by the bracket or support serves to receive the threaded end of the screw 11 which serves to support the band section 12. Hingedly connected by the pintle 13 is the band section 14, which carries the hub closure 15.

The vehicle wheel comprises hub 16 having the ring 17 attached thereto. The hub 16 is also provided at its outer side with the flange 18. Spokes 19 serve to connect the hub 16 to the tire rim 20 on which the tire 21 is mounted. Bolts 22 and nuts 23 serve to attach the vehicle wheel to the support flange 8.

The hub closure 15 is provided with the spaced tongues 24 which are adapted to engage over the flange 18, and which are at opposite sides of the boss 25 into which threads the screw 26 to connect the ends of the band section 14 to the hub closure. An inwardly projecting circumferential rib 27 is carried by the hub closure and adapted to project into the open end of the hub 16 so as to project inwardly beyond the inwardly directed flange 18 as clearly appears in Fig. 4. This flange is cut away to permit the radial movement of the locking plate or tongue 36 so that it may be projected outwardly beyond the rib or flange 27 and lie in engagement with the inner face of the flange 18. This rib or flange is also cut away to provide for the engagement of the anti-rattling spring 40, hereinafter referred to, with the inner face of the inward flange 18 into the hub and engage the same. A covering 28 of sheet metal or other suitable material is used as a facing for the closure 15, and swingable thereon is a cover 30 mounted on the pin 31 which is embraced by the spring 32. This cover 30 serves as a closure for the chamber 29 in which is positioned the lock barrel 33. Projecting eccentrically from the inner end of the lock barrel 33 is a stud 34 which may be rotated by a suitable key arranged to fit the tumbler mechanism contained in the barrel 33. A roller 35 is mounted on the stud 34 and engages in a slot 37 formed in the locking tongue or plate 36. This tongue or plate 36 is adapted to slide in the grooves 38' formed in the guide lugs 38. The grooves 38' formed in the guide lugs 38 afford a greater bearing for the tongue or plate 36 than is provided by the sides of the cut away portion of the flange or rib 27.

Anti-rattling springs 40 are secured in position on the inwardly projecting bosses 39 which are formed on the closure 15.

In use, the vehicle wheel is attached to the bracket flange 8 and the band section 14 is swung upwardly until the tongues 24 snap over the flange 18, the sections 14 and 12 being sufficiently resilient and yieldable to permit this snapping over movement. The closure 15, when in closing or operative position will prevent access to the bolts 22 and nuts 23 by which the wheel is attached to the supporting bracket, so that removal of the wheel will be prevented. The key is then used to rotate the stud 34 to the position whereat the tongue or plate 36, which operates as a lock bolt, is moved to engage behind the flange 18, thus securely locking the closure in position.

In this way I have provided a means for locking the securing means against manipulation and at the same time the device which serves this purpose also serves as a closure for the open end of the wheel hub. Were the wheel to be used with a fender having a well therein, so that the wheel would be engaged in the well when it is being carried as a spare, the use of the band sections would of course be eliminated. It is believed obvious that, if desired, the hub cap, equipped as illustrated in Fig. 1, may be used, when the member 14 is detached therefrom, in the ordinary manner as a hub cap on a wheel which is mounted on the axle so that an unlawful removal of the wheel from the axle is also prevented.

While I have illustrated and described the preferred form of construction I do not wish to limit myself to the precise details of structure shown but desire to avail myself of such variations and modification as come within the scope of the appended claims.

Having thus described my invention what I claim as new and desire to secure by Letters Patent is:

1. In combination, a vehicle wheel having a hub open at one end; a supporting bracket for supporting said wheel; means accessible from within said hub for attaching said wheel on said bracket; a retaining member carried by said bracket and adapted for embracing the rim of the wheel; a hub cap carried by said retaining member and engageable with the hub of said wheel for closing the open end thereof; and key operated means for securing said hub cap in closing position on said hub.

2. In a device of the class described adapted for use with a vehicle wheel having a hub open at one end, a supporting bracket for supporting the wheel; means projectable into the hub of the wheel for attaching the wheel on said bracket; means supported on said bracket for embracing the rim of the wheel; a hub cap carried by said embracing means and engageable with the hub for closing the open end thereof; and means for securing said hub cap in closing position.

3. In combination a wheel hub having an opening, a hub cap having a flange for extending through said opening, a radially shiftable lock member supported on said cap and said cap flange having a guide passageway for the end of said locking member, an actuating member adapted upon rotational movement to cause radial shift of said locking member to locking or unlocking position, the outer end of said locking member when in locking position being projected behind the hub wall surrounding the hub opening whereby to lock the cap to the hub, a housing supported by said cap, a rotatable member journaled in said housing and connected with said locking bar actuating member, and means for locking said rotational member against rotation after actuation thereby of said actuating member to shift said locking member into locking position.

4. In combination, an open faced wheel hub terminating at its outer end in a radially inwardly projecting flange; a hub cap mountable on said hub in engagement with the outer face of said flange for closing said open face; securing means carried by said cap engageable behind said flange, upon movement to operative position, for securing said cap on said hub; and means for moving said securing means to operative and inoperative position.

5. In combination, an open faced wheel hub terminating at its outer end in a radially inwardly projecting flange; a hub cap mountable on said hub in engagement with the outer face of said flange for closing said open face; securing means carried by said cap engageable behind said flange, upon movement to operative position, for securing said cap on said hub; and a locking mechanism for locking said securing means in operative position.

6. In combination, an open faced wheel hub terminating at its outer end in a radially inwardly projecting flange; a hub cap mountable on said hub in engagement with the outer face of said flange for closing said open face; securing means carried by said cap engageable behind said flange, upon movement to operative position, for securing said cap on said hub; and key operated means for moving said securing means to operative and inoperative position.

7. In combination, a vehicle wheel hub having an open outer end; an inwardly projecting flange surrounding the opening in said end; a cap for closing said open end, engageable with the outer surface of said flange; movable securing means carried by said cap and movable to operative and inoperative position and adapted upon movement to operative position for engaging the inner surface of said flange; and key operated means for moving said securing means to operative position.

8. In combination, a wheel hub having an open outer end; an inwardly projecting flange surrounding the opening in said end; a cap for closing said end and adapted for engaging the outer surface of said end; movable securing means carried by said cap and movable to operative and inoperative position and adapted, when in operative position, for engaging behind said flange and retaining said cap in engagement with the outer end of said hub; means for moving said securing means to operative and inoperative position; and means for locking said moving means against movement upon movement of said securing means to operative position.

EDWIN P. HURD.